Sept. 13, 1960     R. R. HAIG     2,952,617
PREVENTION OF DISPERSE PHASE COKE DEPOSITION IN FLUID COKER
Filed Dec. 18, 1956

Richard R. Haig    Inventor

By L. Chasan Attorney

United States Patent Office 2,952,617
Patented Sept. 13, 1960

2,952,617

PREVENTION OF DISPERSE PHASE COKE DEPOSITION IN FLUID COKER

Richard R. Haig, Westfield, N.J., assignor to Esso Research and Engineering Company, a corporation of Delaware Filed Dec. 18, 1956, Ser. No. 629,187

11 Claims. (Cl. 208—127)

The present invention relates to an improved method and apparatus for fluidized coking of heavy hydrocarbon oils. More particularly, it is concerned with the prevention of coke deposition on the walls and inner structural members of the upper part of the coking reactor.

The use of a fluidized bed of hot, non-catalytic particulate solids for the conversion of heavy hydrocarbon oil is well known in the prior art. Feeds, such as crudes, topped crudes, residua and the like are suitably preheated and injected into a dense, turbulent reaction bed of particles maintained at a temperature of about 900° F. to 1300° F. Typically the feed has an initial boiling point of about 700° F. or higher, an A.P.I. gravity of about 0° to 20°, and a Conradson carbon residue content of about 5 to 40 wt. percent.

Upon contact with the hot solids particles, the oil is converted into vaporous reaction products and carbonaceous material which is continuously deposited upon the contact solids. Normally, at least a portion of the particles coated in this manner are withdrawn from the coking vessel and circulated to a combustion zone wherein oxidation of part of the carbonaceous material serves to heat the solids to requisite high temperatures. The heated solids are then recirculated to the reaction bed thereby providing thermal energy for the conversion process.

In the past, gaseous conversion products have passed up from the fluidized conversion bed directly into the disperse phase of the reactor. The hydrocarbon vapors, substantially in equilibrium with the oil undergoing cracking, leave the conversion bed at temperatures only slightly above or approximately at the dew point of the heavier vaporized constituents. Cooling the product vapors in the dilute solids zone above the reaction bed reduces the temperature of these heavy ends below their dew point thus causing condensation of the less volatile components upon the walls of the reactor, internal structural members, and cyclone separating equipment normally located within the coking vessel. These internal surfaces are rapidly coated with heavy layers of coke. Carbonaceous deposits continuously build up, and may reach levels interfering with the flow of vapors. Such coke deposition frequently necessitates interruptions in normal coking operations and may require expensive cleaning procedures. Hence, there is considerable need for a means of preventing condensation of the heavier components of the product vapors in the dispersed phase of the reactor.

The present invention overcomes this difficulty caused by the condensation of heavy ends by providing a bed of hot, dry solids in the upper part of the coking vessel, intermediate to the fluidized reaction bed and the dilute phase zone. This intermediate zone of solids is actually in direct contact with the conversion bed; baffle means restricting or substantially preventing the upward flow of sticky oil-coated conversion bed particles into the superimposed bed. Hence, a distinct zone of dry solids, 5° to 100° F. hotter than the reaction bed, is maintained. As vaporous conversion products pass upwardly through this heating zone, their temperature is sufficiently raised to remain above the dew point during their subsequent flow through the disperse phase zone of the coking reactor.

Although numerous previous proposals have been advanced for controlling the temperature of reactor vapors, the present invention affords a most advantageous means for preventing condensation and coke formation in the dilute phase of a fluid coking vessel. Gaseous conversion products are subjected to substantially uniform superheating as they all pass through the present intermediate zone of even, high temperature. The degree of vapor heating is readily controlled responsive to changes in the depth of the superimposed bed. Since the particles in this zone are relatively dry and free of non-volatilized oil fractions, bed solids entrained in the stream of vaporous products will not tend to adhere to the walls of the reactor and other internal structural surfaces.

Because the superimposed bed is in actual contact with the conversion bed, there is no free vapor space between the reaction and heating zones. There is, therefore, less opportunity for rising vapors to condense on the walls of the intermediate section of the reactor. Total height or size of the coking vessel, and hence capital investment, are maintained at relatively low values.

In a preferred mode of operation, a single supply of hot particles freshly heated in an external heating zone is introduced into the reactor above the level of the baffle structure. These dry, hot solids first serve to compose the intermediate heating bed, and gradually pass downwardly through the baffled section into the reaction zone wherein they serve as requisite contact particles for the oil feed. Hence a single burner vessel and reactor inlet conduit serve to supply solids for the entire coking vessel.

By way of clarifying the nomenclature employed in describing the present invention, it should be understood that the terms "conversion" or "reaction bed" refer to the fluidized mass of solids in the lower portion of the reactor which serves to receive and pyrolyze the oil feed. The expressions "superimposed bed" and "superheating zone" denote the intermediate solids bed maintained between reaction and dispersed phase zones of the coking reactor.

The invention will be better understood with reference to the following description, example, and accompanying drawing which illustrate the unique process and apparatus features presently claimed.

Figure 1:
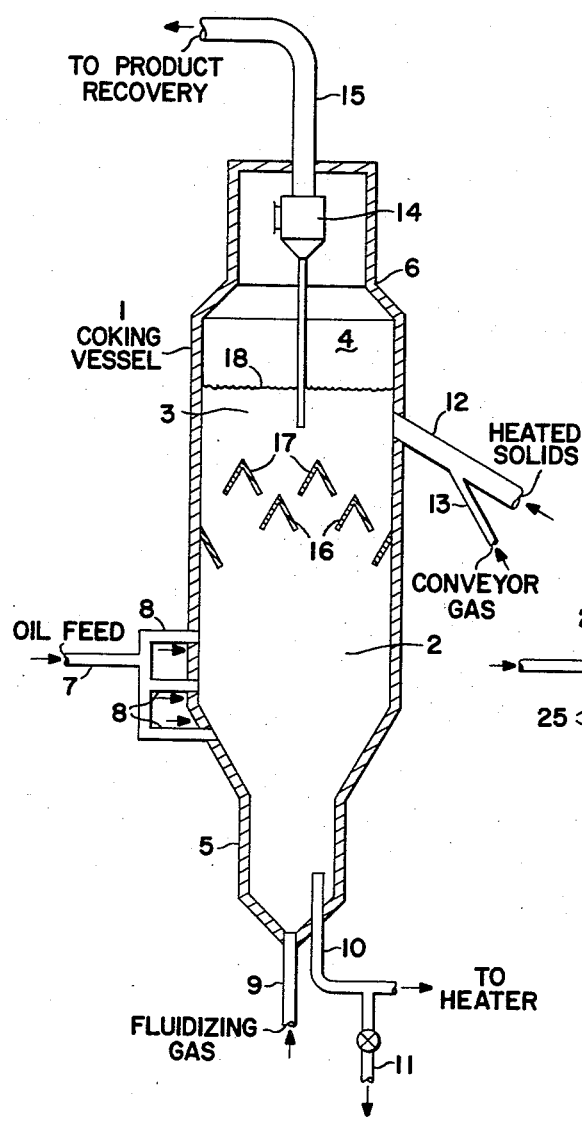
Figure 1 depicts one embodiment of the present invention wherein a plurality of layers of shed-type baffles separate the conversion and heating beds.

Referring to Figure 1, there is shown a coking vessel 1 containing in its lower portion a reaction bed of inert, particulate solids maintained at a coking temperature of about 900° to 1300° F. Normally these contacting solids comprise coke particles, although sand, ceramic beads and the like may be employed. Hydrocarbon oil feed, such as a Hawkins residuum boiling above 900° F., is preheated to a temperature of about 400° to 700° F. The oil is passed from line 7 into multiple discharge nozzles 8 from which it is discharged at various vertical levels into reaction bed 2.

Upon contact with the hot particles in the bed, the oil feed is thermally cracked to give lighter vaporous conversion products and coke, the coke and unvaporized oil constituents depositing on the contact particles. The gaseous materials pass upwardly into the dispersed phase zone 4. Entrained solids are separated in cyclone separator 14 and returned to a lower portion of the coking vessel. Hydrocarbon vapors are withdrawn through line 15 and may be further subjected to conventional product recovery treatment operations such as scrubbing and fractionation.

Fluidizing gas, such as steam, hydrocarbon vapor or a mixture thereof, is introduced into lower extremity of the coking reactor through conduit 9. The bottom section 5 of the vessel is preferably of reduced cross-section. By employing this design, section 5 serves as a stripping zone for the removal of hydrocarbons which have occluded on the contact solids. The fluidizing gas along with stripped hydrocarbons then pass upwardly into reaction zone 2 at a velocity of about 0.5 to 4.0 ft./sec.

Solids are normally continuously removed from the coking reactor by line 10 and circulated to an external heater not shown in the drawing. Product coke may be withdrawn through line 11, and used for boiler fuel or further processed for other applications. The heater, which may be a transfer line or fluid bed type burner, raises the temperature of the solids to about 1000 to 1400° F. These substantially dry, heated solids are then recirculated back to the coking reactor as will be further described.

According to the present invention, a distinct heating zone 3 composed of hot, dry particulate solids is maintained above and in contact with the dense, fluidized conversion bed 2. As shown, shed baffles 16 and 17, numerically characterized to indicate two horizontal layers of baffle elements, substantially limit the upward flow of inert, sticky contact particles into the superimposed bed while permitting downward flow of dry solids in response to changes in particle inventory in the conversion bed. While it is advantageous to employ a plurality of baffle layers, the use of a single such layer should be understood as falling within the spirit of the present invention.

Pyrolitic gaseous conversion products, along with steam and volatilized, unconverted oil feed constituents pass upwardly from the reaction bed to heating zone 3 through the restricted passageways defined by the baffle structures shown. The temperature of the vapors leaving the reaction bed is raised by about 5 to 100° F. as they flow upwardly through the superimposed bed of hot dry particles, thus maintaining the product vapors above their dew point in their passage through disperse phase 4 of the coking reactor.

Hot, dry solids, normally particles previously withdrawn from the coking bed and subjected to heat treatment, are introduced by conduit 12 into the upper portion of the coker, preferably directly into the superimposed heating zone. Conveyor gas, admitted into conduit 12 by line 13, may be regulated in amount to control the quantity of solids entrained in the upper portion of the coking vessel. To further induce entrainment, and reduce vapor phase cracking time, the upper portion 6 of the coking vessel may be reduced in diameter to increase velocities of the vapors to about 3 to 6 ft./sec. in the area surrounding cyclone 14.

Figure 2:
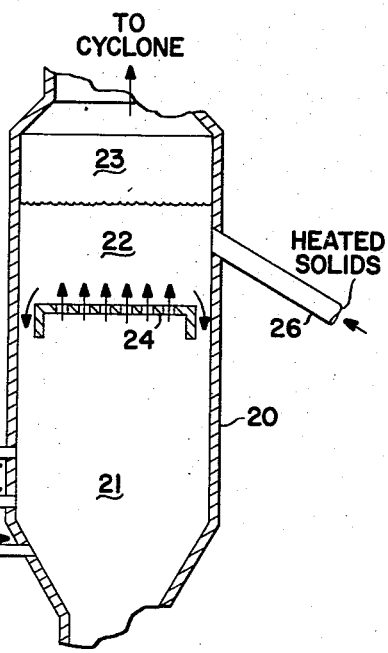
Figure 2 illustrates the use of a perforated grid to maintain a distinct superimposed bed.

Figure 2 illustrates an alternative means of operating within the scope of the present invention. As in the previous description, oil is introduced by multiple feed nozzles 25 into fluidized reaction bed 21 maintained within lower section of coking vessel 20. Perforated grid 24 substantially limits or prevents the flow of reaction bed solids upwardly into superimposed heating zone 22 while permitting the downward flow of hot, dry solids. The freshly heated solids admitted into the reactor through line 26 initially form bed 22, and later descend into conversion bed 21 wherein they serve to receive the oil feed. The particles may be introduced into the dispersed phase 23 or directly into heating bed 22.

The drawing indicates the upward flow of vaporous material through zone 22 and into dilute phase 23 as opposed to the primarily downward flow of hot solids from the superimposed heating zone.

While shed-type baffles, and a perforated grid have been shown as means for maintaining a distinct heating bed zone in the upper portion of the reation vessel, other structural devices well known to the art may be equally applicable to the practice of the present invention.

*Example I*

Referring to Figure 1, conversion bed 2 contains fluid coke particles averaging about 40–800 microns in size and at a temperature of 950° F. About 200 bbls./hr. of residuum is introduced through nozzles 8. The oil feed has an initial boiling point of 850° F., an A.P.I. gravity of 4°, and a Conradson carbon content of 25 wt. percent. Approximately 3500 lbs./hr. of steam is introduced through line 9 to fluidize the bed.

The feed is converted to about 70 wt. percent gaseous products which pass up through heating bed 3 into dilute phase 4. Approximately 10 lbs. of coke/lb. of feed is removed by line 10 and circulated to an external heater before being returned to the coking reactor.

The reactor diameter in the baffled section is 12 ft., with 60% of the free cross-sectional area available for flow of vapors and solids.

Vaporous products leaving reaction zone 2 have a dew point of about 950° F. The temperature of superimposed bed 3 is 975° F.

Without practice of this invention, the temperature of the gases in dilute phase 4 would be reduced to about 920° F. In accordance with this invention, the vapors are maintained at a temperature above 960° F., thereby preventing condensation and coke deposition in the upper part of the coking vessel.

Having described the present invention, what is sought to be protected by Letters Patent is succinctly set forth in the following claims.

What is claimed is:

1. In a process for the conversion of hydrocarbons wherein a hydrocarbon oil is injected into a conversion bed of fluidized particles maintained at a coking temperature thereby converting said oil to gaseous materials and carbonaceous residue which is deposited on said particles, and wherein said gaseous material passes upwardly and is withdrawn overhead, the method of preventing coke deposition in the area above said conversion bed which comprises maintaining a superimposed bed of hot, dry particles of the same kind and size as those in said conversion bed in direct contact with said conversion bed of solids while substantially preventing the flow of particles from said conversion bed to said superimposed bed, whereby upflowing gaseous material passing upwardly from said conversion bed is heated and maintained at a temperature above its dew point and coke deposition in the area above said conversion zone is minimized.

2. The method of claim 1 wherein said superimposed bed is formed by the introduction of freshly heated particles into the area above said conversion bed, said particles having been previously withdrawn from said conversion bed and heated in a heating zone.

3. The method of claim 1 wherein the temperature of said superimposed bed is 5° to 100° F. greater than the temperature of said conversion bed.

4. An improved fluid coking process which comprises maintaining a reaction bed of fluidized inert solids at a coking temperature in a coking zone, establishing and maintaining a superimposed bed of hot, dry solids in direct contact with said reaction bed while substantially preventing the flow of solids from said reaction bed to said superimposed bed, contacting an oil with the solids in said reaction bed to produce vaporous conversion products and carbonaceous material which is deposited on said solids, withdrawing a portion of said reaction bed solids and circulating said solids to an external heating zone, introducing a stream of reheated solids into the area above said reaction bed by means of a conveyor gas, said reheated solids becoming a part of said superimposed bed, and withdrawing said vaporous conversion products upwardly through said superimposed bed thus maintaining the vaporous conversion products above their condensation temperature.

5. The process of claim 4 wherein the amount of conveyor gas is regulated to control the quantity of solids entrained in said vaporous conversion products.

6. An improved fluid coking process which comprises maintaining a reaction bed of fluidized inert solids at a coking temperature in a coking zone, establishing and maintaining a superimposed bed of hot, dry solids in direct contact with said reaction bed while substantially preventing the flow of solids from said reaction bed to said superimposed bed, injecting oil to be converted into said reaction bed to produce vaporous conversion products and carbonaceous deposits on said solids, withdrawing solids from the lower portion of said reaction bed and circulating them to an external heating zone, introducing a stream of reheated solids into said superimposed bed of solids for downward passage through said coking zone and withdrawing vaporous conversion products upwardly through said superimposed bed of solids and from the upper part of said coking zone to maintain the vaporous conversion products above their condensation temperature and prevent coking in the upper portion of said coking zone.

7. A process according to claim 6 wherein said superimposed bed of solids is at a higher temperature than the solids in said reaction bed.

8. A process according to claim 1 wherein the temperature of the solids in said superimposed bed is higher than that of the solids in said conversion bed, solids are withdrawn from a lower portion of said conversion bed and reheated and the heated solids returned to said superimposed bed for downward flow from said superimposed bed to said conversion bed.

9. In a process for the conversion of hydrocarbons wherein hydrocarbon oil is injected into a conversion bed of fluidized solid particles maintained in a coking zone and at a coking temperature to convert said oil to gaseous materials and carbonaceous residue which is deposited on said particles and wherein said gaseous material passes upwardly and is withdrawn overhead, the method of preventing coke deposition in the area above said conversion bed which comprises maintaining a superimposed bed of hot, dry particles of substantially the same size and kind as those in said conversion bed and at a higher temperature than the solids in said conversion bed in direct contact with said conversion bed of solids while substantially preventing the flow of particles from said conversion bed to said superimposed bed so that upflowing converted gaseous material is heated and maintained at a temperature above its dew point and solids from said superimposed bed of hot dry solids pass down into said conversion bed in response to diminution in the particle inventory in said conversion bed.

10. In a process for the conversion of hydrocarbons wherein a hydrocarbon oil is injected into a conversion bed of fluidized solid particles maintained at a coking temperature to convert said oil to gaseous materials and carbonaceous residue which is deposited on said solid particles and wherein said gaseous material passes upwardly and is withdraw overhead, the method of preventing coke deposition in the area above said conversion bed which comprises maintaining a superimposed bed of hot, dry solid particles in direct contact with said conversion bed of solids while substantially preventing the flow of particles from said conversion bed to said superimposed bed so that upflowing converted gaseous material is heated and maintained at a temperature above its dew point, maintaining the temperature of the solids in said superimposed bed higher than that of the solids in said conversion bed, withdrawing solids directly from the fluidized bed of solids in said conversion bed and reheating them and returning the heated solids to said superimposed bed for downward flow from said superimposed bed to said conversion bed.

11. In a process for the conversion of hydrocarbons wherein hydrocarbon oil is injected into a conversion bed of fluidized solid particles maintained in a coking zone and at a coking temperature to convert said oil to gaseous materials and carbonaceous residue which is deposited on said particles and wherein said gaseous material passes upwardly and is withdrawn overhead, the method of preventing coke deposition in the area above said conversion bed which comprises introducing hot dry solid particles into the upper portion of said coking zone and maintaining a superimposed bed of hot, dry particles of substantially the same size and kind and at a higher temperature than the solids in said conversion bed in direct contact with said conversion bed of solids while substantially preventing the flow of particles from said conversion bed to said superimposed bed so that upflowing converted gaseous material is heated and maintained at a temperature above its dew point, withdrawing solid particles directly from said conversion bed as product and maintaining the inventory of said conversion bed by passing hot solids from said superimposed bed of hot particles down into said conversion bed.

References Cited in the file of this patent

UNITED STATES PATENTS

| | | |
|---|---|---|
| 2,635,949 | Fenske et al. | Apr. 21, 1953 |
| 2,742,403 | Nicholson et al. | Apr. 17, 1956 |
| 2,760,917 | Ward | Aug. 28, 1956 |
| 2,807,571 | Murphy et al. | Sept. 24, 1957 |
| 2,815,268 | Kaulakis | Dec. 3, 1957 |